United States Patent
Eo et al.

(10) Patent No.: US 10,598,257 B2
(45) Date of Patent: Mar. 24, 2020

(54) TRANSMISSION FOR ELECTRIC VEHICLE

(71) Applicants: Hyundai Motor Company, Seoul (KR); Kia Motors Corporation, Seoul (KR)

(72) Inventors: Soon Ki Eo, Ansan-si (KR); Min Ho Chae, Incheon (KR); Sun Sung Kwon, Anyang-si (KR); Ma Ru Kang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 20 days.

(21) Appl. No.: 16/171,823

(22) Filed: Oct. 26, 2018

(65) Prior Publication Data

US 2020/0031223 A1    Jan. 30, 2020

(30) Foreign Application Priority Data

Jul. 30, 2018  (KR) .......................... 10-2018-0088544

(51) Int. Cl.
| | |
|---|---|
| *B60K 17/12* | (2006.01) |
| *F16H 1/28* | (2006.01) |
| *F16H 3/46* | (2006.01) |
| *F16H 1/46* | (2006.01) |
| *B60K 17/06* | (2006.01) |

(52) U.S. Cl.
CPC .............. *F16H 3/46* (2013.01); *B60K 17/12* (2013.01); *F16H 1/28* (2013.01); *F16H 1/46* (2013.01); *B60K 17/06* (2013.01); *F16H 2200/0021* (2013.01); *F16H 2200/2007* (2013.01); *F16H 2200/2038* (2013.01); *F16H 2200/2097* (2013.01)

(58) Field of Classification Search
CPC ........ B60K 17/04; B60K 17/06; B60K 17/12; F16H 1/28; F16H 1/46; F16H 3/44; F16H 3/46; F16H 3/48; F16H 2200/0021; F16H 2200/2007; F16H 2200/2038; F16H 2200/2097
See application file for complete search history.

(56) References Cited

U.S. PATENT DOCUMENTS 9,447,848 B2 * 9/2016 Beck .......................... F16H 3/66

FOREIGN PATENT DOCUMENTS

KR    10-2017-0018220 A    2/2017

* cited by examiner

*Primary Examiner* — Jacob S. Scott
(74) *Attorney, Agent, or Firm* — Morgan, Lewis & Bockius LLP

(57) ABSTRACT

A transmission for electric vehicle may include first input shaft connected to motor, first planetary gear set including first rotation element selectively connectable to the first input shaft and third rotation element which is fixed, second planetary gear set including first rotation element directly connected to the first input shaft and third rotation element directly connected to second rotation element of the first planetary gear set, first clutch selectively connecting the first input shaft and second rotation element of the second planetary gear set, output shaft, driving gear rotating with the second rotation element of the second planetary gear set, driven gear engaged with the driving gear, second clutch selectively connecting the first rotation element of the first planetary gear set to the first input shaft, and third clutch disposed to fix or engage the third rotation element of the second planetary gear set with the driving gear.

10 Claims, 9 Drawing Sheets

TRANSMISSION FOR ELECTRIC VEHICLE

CROSS-REFERENCE TO RELATED APPLICATION

The present application claims priority to Korean Patent Application No. 10-2018-0088544, filed on Jul. 30, 2018 in the Korean Intellectual Property Office, the entire contents of which is incorporated herein for all purposes by this reference.

BACKGROUND OF THE INVENTION

Field of the Invention

The present invention relates to a transmission for an electric vehicle and, more particularly to a configuration of a powertrain that can sufficiently secure drivability of a vehicle while using a driving motor having as small of a capacity as possible.

Description of Related Art

Electric vehicles are provided with power for driving from a driving motor instead of an engine. The price of the driving motor usually increases in proportion to the capacity or the size thereof, and the larger the size of the driving motor, the larger the range of power which may be provided, but the larger the weight of the vehicle, which causes reduction of fuel efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission for an electric vehicle, the transmission being able to be conveniently mounted on a vehicle because it has as simple configuration and as small of a volume as possible, being suitable for improving a mileage and fuel efficiency of a vehicle because it is lightweight, and being able to secure sufficient drivability such as the maximum speed, an acceleration ability, and a hill climbing ability of a vehicle even using a small-capacity driving motor because it provides a relatively high reduction ratio.

In accordance with an aspect of the present invention, there is provided a transmission for an electric vehicle, the transmission may include a first input shaft directly connected to a motor, a first planetary gear set including three rotation elements including a first rotation element which is disposed to be selectively connectable to the first input shaft and a third rotation element which is fixed, a second planetary gear set including three rotation elements including a first rotation element directly connected to the first input shaft and a third rotation element directly connected to a second rotation element of the first planetary gear set, a first clutch disposed to connect or disconnect the first input shaft and a second rotation element of the second planetary gear set, an output shaft disposed in parallel with the first input shaft, a driving gear disposed to rotate integrally with the second rotation element of the second planetary gear set, a driven gear disposed on the output shaft to be engaged with the driving gear, a second clutch disposed to connect or disconnect the first rotation element of the first planetary gear set to or from the first input shaft, and a third clutch disposed to fix or engage the third rotation element of the second planetary gear set with the driving gear.

The first planetary gear set may be a simple single pinion planetary gear set, wherein the first rotation element may be a first sun gear, the second rotation element may be a first planet carrier, and the third rotation element may be a first ring gear, and the second planetary gear set may be a simple single pinion planetary gear set, wherein the first rotation element may be a second sun gear, the second rotation element may be a second planet carrier, and the third rotation element may be a second ring gear.

The first clutch may be a friction clutch that can transmit power using friction, and the second clutch and the third clutch may be engaging parts that can transmit power by engaging with a gear.

In accordance with another aspect of the present invention, there is provided a transmission for an electric vehicle, the transmission may include a first input shaft directly connected to a motor, a first planetary gear set and a second planetary gear set disposed on the first input shaft, each including three rotation elements, in which one rotation element of three rotation elements and one rotation element of the other three rotation elements are continuously connected to each other, a first clutch disposed to connect or disconnect two rotation elements of the second planetary gear set, a second clutch disposed to connect or disconnect the other rotation elements of the first planetary gear set and the other rotation elements of the second planetary gear set except for the continuously connected rotation elements, a third clutch disposed to restrict rotation of the continuously connected rotation elements of the first planetary gear set and the second planetary gear set, and an output shaft disposed to receive torque from the second planetary gear set.

The first planetary gear set may be a simple single pinion planetary gear set, in which the three rotation elements may be a first sun gear, a first planet carrier, and a first ring gear, the second planetary gear set may be a simple single pinion planetary gear set, in which the three rotation elements may be a second sun gear, a second planet carrier, and a second ring gear, the continuously connected rotation elements may be the first planet carrier and the second ring gear, the first ring gear may be continuously fixed, and the second sun gear may be continuously connected to the first input shaft.

The first clutch may be disposed to connect or disconnect the second sun gear and the second planet carrier of the second planetary gear set, and the second clutch may be disposed to connect or disconnect the first sun gear of the first planetary gear set and the second sun gear of the second planetary gear set.

The output shaft may receive power through a driving gear directly connected to the second planet carrier of the second planetary gear set and a driven gear disposed on the output shaft to engage with the driving gear.

The third clutch may switch a state of restricting rotation of the continuously connected first planet carrier and second ring gear and a state of connecting the first planet carrier and the second ring gear to the driving gear.

The third clutch may switch a state of restricting rotation of the first planet carrier and the second ring gear and a state of connecting the second ring gear to the second planet carrier.

The transmission according to an exemplary embodiment of the present invention may be conveniently mounted on a vehicle because it has as simple configuration and as small of a volume as possible, is suitable for improving a mileage and fuel efficiency of a vehicle because it is lightweight, and can provide sufficient drivability such as the maximum speed, an acceleration ability, and a hill climbing ability of a vehicle even using a small-capacity driving motor because it provides a relatively high reduction ratio.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention wherein the specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Figure 1:
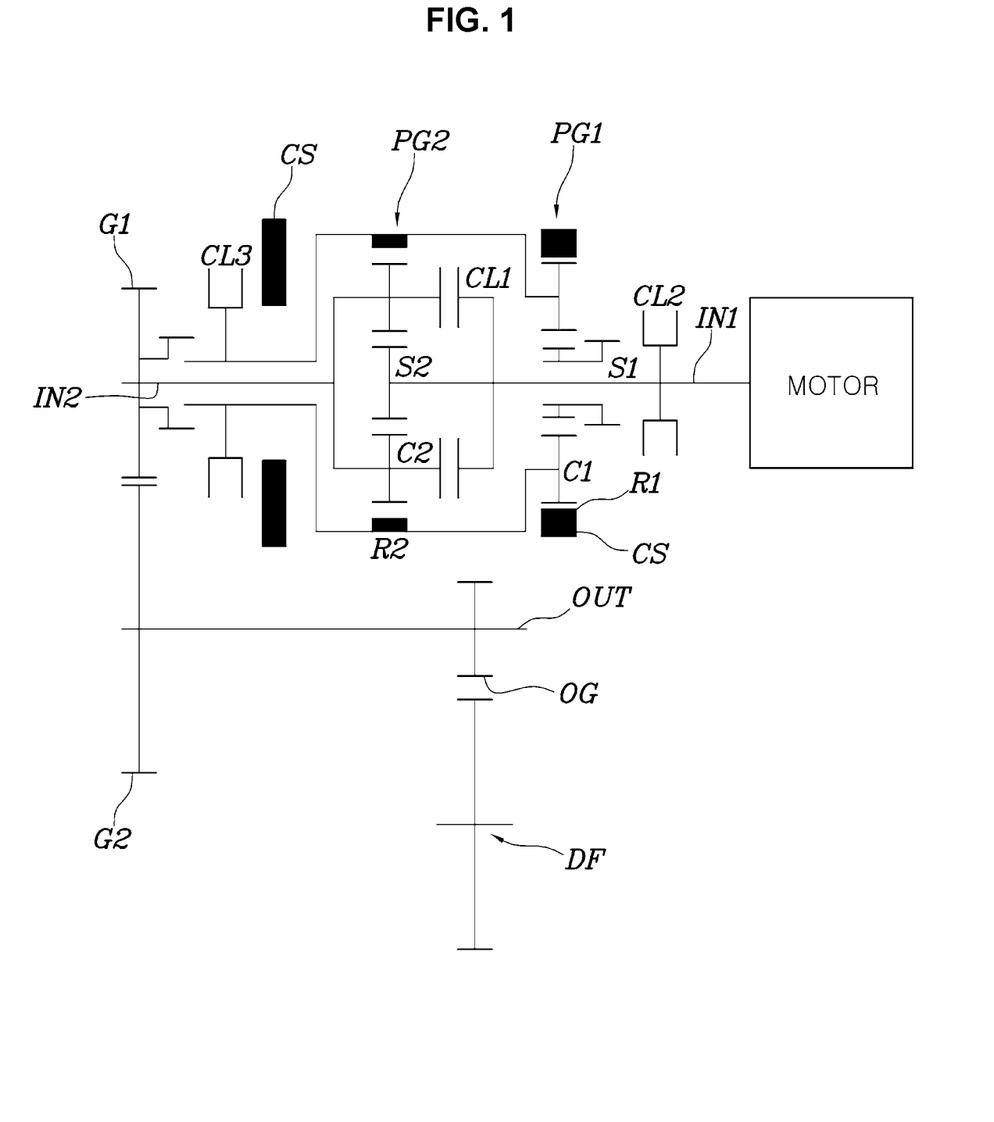
FIG. 1 is a diagram showing the configuration of a transmission for an electric vehicle according to an exemplary embodiment of the present invention.

Referring to FIG. 1, a transmission for an electric vehicle of the present invention may include a first input shaft IN1 directly connected to a motor, a first planetary gear set PG1 including three rotation elements including a first rotation element which is disposed to be selectively connectable to the first input shaft IN1 and a third rotation element which is fixed, a second planetary gear set PG2 including three rotation element including a first rotation element directly connected to the first input shaft IN1 and a third rotation element directly connected to a second rotation element of the first planetary gear set PG1, a first clutch CL1 disposed to connect or disconnect the first input shaft IN1 and a second rotation element of the second planetary gear set PG2, an output shaft OUT disposed in parallel with the first input shaft IN1, a driving gear G1 disposed on a second input shaft IN2 to rotate integrally with the second rotation element of the second planetary gear set PG2, a driven gear G2 disposed on the output shaft OUT to be engaged with the driving gear G1, a second clutch CL2 disposed to connect or disconnect the first rotation element of the first planetary gear set PG1 to or from the first input shaft IN1, and a third clutch CL3 disposed on the second input shaft IN2 to fix or engage the third rotation element of the second planetary gear set PG2 with the driving gear G1.

That is, the transmission of the present invention is configured to output power from a motor which is input to the first input shaft IN1 to the output shaft OUT through the driving gear G1 and the driven gear G2 by appropriately changing the power using the first clutch CL1, the second clutch CL2, and the third clutch CL3 that control the first planetary gear set PG1 and the second planetary gear set PG2 and the rotation elements of the planetary gear sets.

In the exemplary embodiment of the present invention, an output gear OG is integrally disposed on the output shaft OUT to be configured to output power to driving wheels through a differential DF.

The first planetary gear set PG1 is a simple single pinion planetary gear set, in which the first rotation element is a first sun gear S1, the second rotation element is a first planet carrier C1, and the third rotation element is a first ring gear R1 wherein the second planetary gear set PG2 is a simple single pinion planetary gear set, in which the first rotation element is a second sun gear S2, the second rotation element is a second planet carrier C2, and the third rotation element is a second ring gear R2.

The first clutch CL1 is a friction clutch that can transmit power using friction, and the second clutch CL2 and the third clutch CL3 are engaging parts that can transmit power by engaging with a gear.

The friction clutch can transmit power using friction which is generated on a friction surface by pressure from the outside. Furthermore, the friction clutch may be, for example, a friction disc type clutch that can adjust the magnitude of friction in accordance with the pressure.

The engaging parts are mechanisms that can engage and disengage a gear such as dog clutch or a synchronizer and keep gears engaged even though power is not separately provided from the outside thereof once the gears are engaged. Accordingly, as described below, power is not separately consumed while a vehicle keeps driving in a gear engaged with the engaging parts, so they can contribute to increasing the mileage of a vehicle and improving fuel efficiency.

The transmission for an electric vehicle having the present configuration in accordance with various aspects of the present invention may be referred to as follows.

That is, the transmission for an electric vehicle of the present invention may include a first input shaft IN1 directly connected to a motor, a first planetary gear set PG1 and a second planetary gear set PG2 disposed on the first input shaft IN1, each including three rotation elements, in which one rotation element of three rotation elements and one rotation element of the other three rotation elements are continuously connected to each other, a first clutch CL 1 disposed to connect or disconnect two rotation elements of the second planetary gear set PG2, a second clutch CL2 disposed to connect or disconnect the other rotation elements of the first planetary gear set PG1 and the other rotation elements of the second planetary gear set PG2 except for the continuously connected rotation elements, a third clutch CL3 disposed to restrict rotation of the continuously connected rotation elements of the first planetary gear set PG1 and the second planetary gear set PG2, and an output shaft OUT disposed to receive torque from the second planetary gear set PG2.

The first planetary gear set PG1 is a simple single pinion planetary gear set, in which the three rotation elements are a first sun gear S1, a first planet carrier C1, and a first ring gear R1, the second planetary gear set PG2 is a simple single pinion planetary gear set, in which the three rotation elements are a second sun gear S2, a second planet carrier C2, and a second ring gear R2, the continuously connected rotation elements are the first planet carrier C1 and the second ring gear R2, the first ring gear R1 is fixedly connected to a stationary member such as a transmission housing CS, and the second sun gear S2 is continuously connected to the first input shaft IN1.

The first clutch CL1 is disposed to connect or disconnect the second sun gear S2 and the second planet carrier C2 of the second planetary gear set PG2 and the second clutch CL2 is disposed to connect or disconnect the first sun gear S1 of the first planetary gear set PG1 and the second sun gear S2 of the second planetary gear set PG2.

The output shaft OUT receives power through a driving gear G1 directly connected to the second planet carrier C2 of the second planetary gear set PG2 and a driven gear G2 disposed on the output shaft OUT to engage with the driving gear G1.

The third clutch CL3 can switch a state of restricting rotation of the continuously connected first planet carrier C1 and second ring gear R2 and a state of connecting the first planet carrier C1 and the second ring gear R2 to the driving gear G1.

That is, the third clutch CL3 can switch a state of restricting rotation of the first planet carrier C1 and the second ring gear R2 and a state of connecting the second ring gear R2 to the second planet carrier C2.

A shifting process by the transmission for an electric vehicle having the present configuration of the present invention is described with reference to FIGS. 2 to 9.

Figure 2:
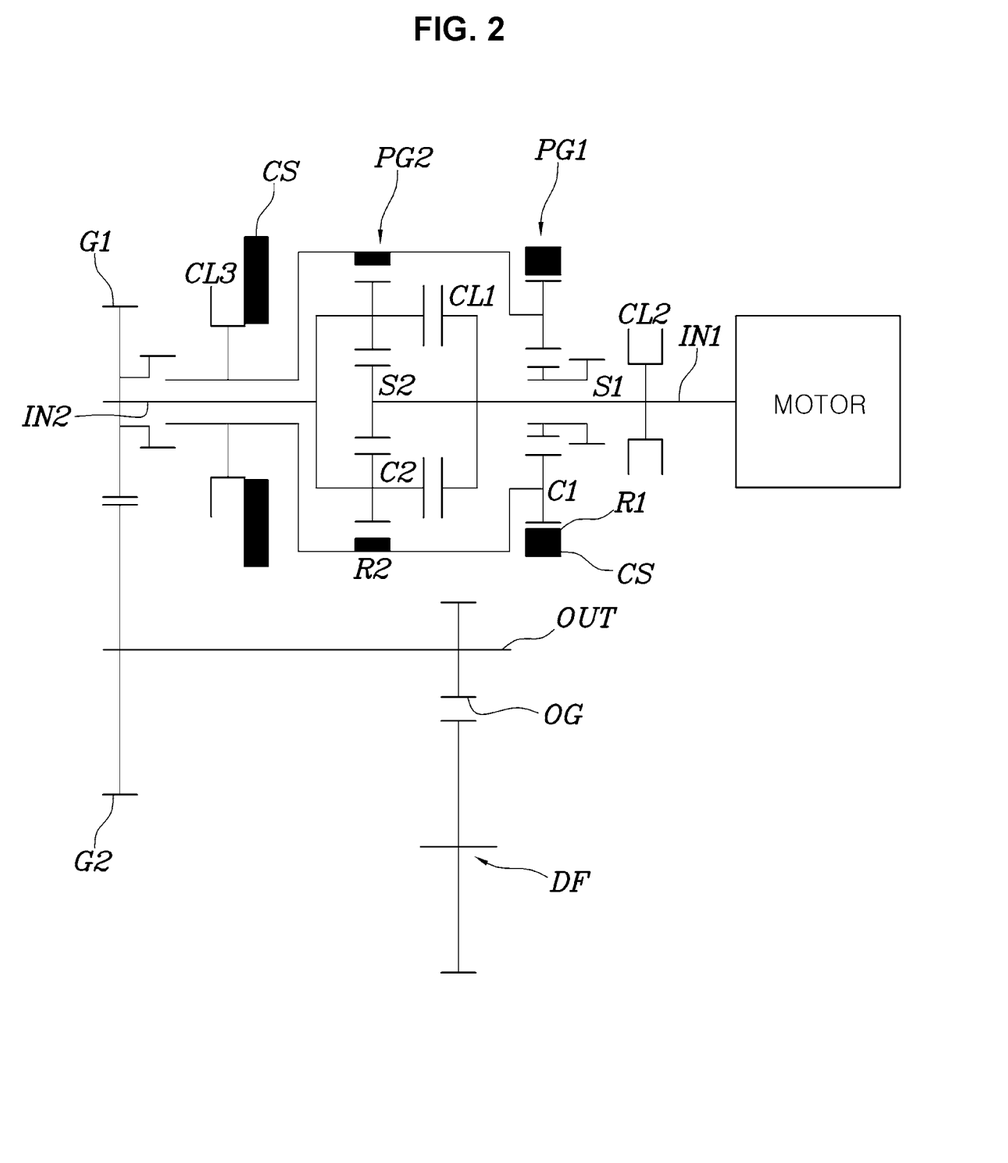
FIG. 2, FIG. 3, FIG. 4, FIG. 5, FIG. 6, FIG. 7, FIG. 8, and FIG. 9 are diagrams sequentially illustrating a shifting process by the transmission shown in FIG. 1.

FIG. 2 shows the state in which the first planet carrier C1 and the second ring gear R2 are fixed to a transmission housing CS by the third clutch CL3 to shift into a first gear from a neutral state.

Figure 3:
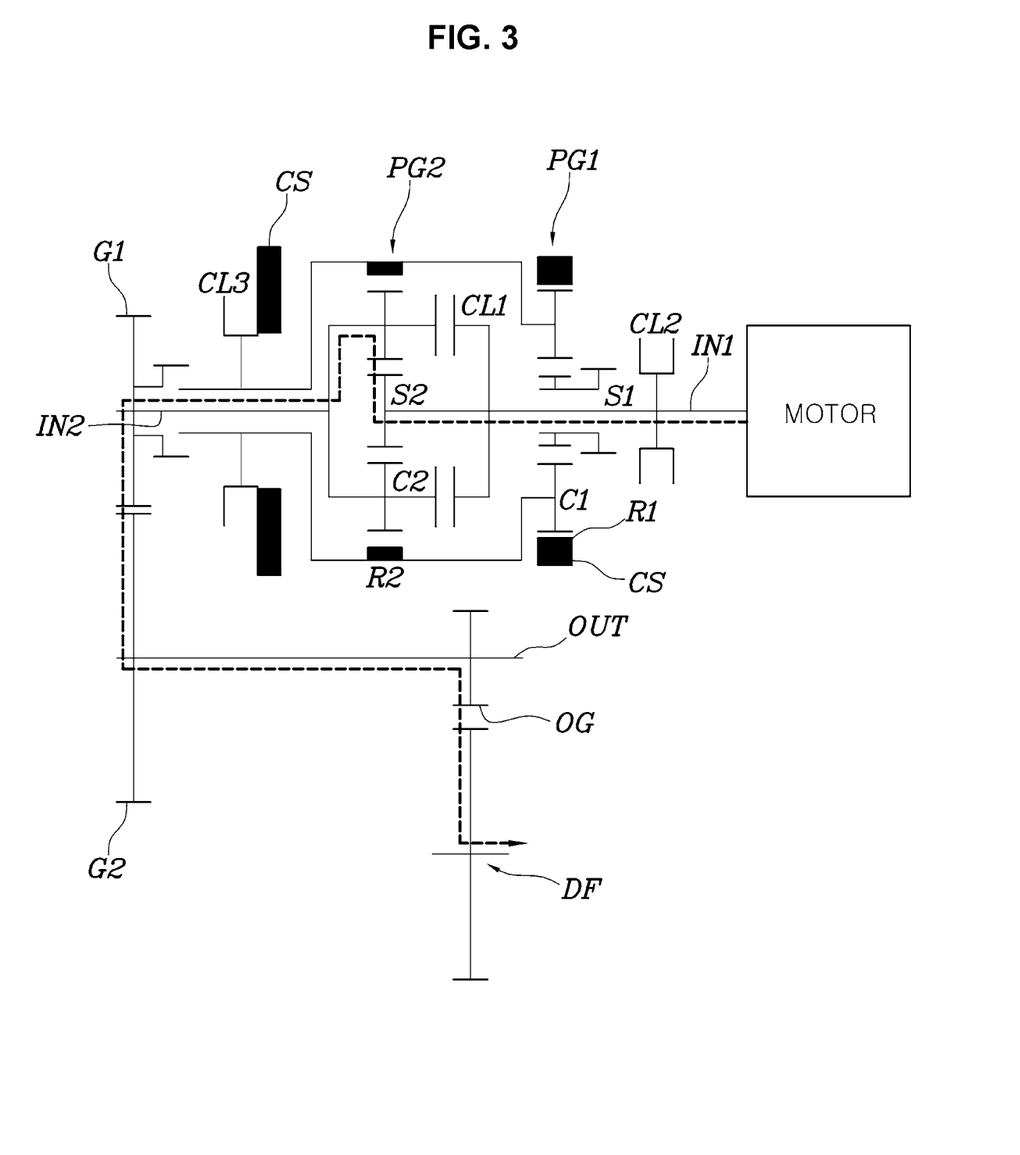

When the motor is driven in the state shown in FIG. 2, the power from the motor is input to the second sun gear S2 of the second planetary gear set PG2 and is then reduced and output to the second planet carrier C2, as shown in FIG. 3 wherein the power is transmitted to the output shaft OUT through the driving gear G1 and the driven gear G2, providing first-gear power to driving wheels through the output gear OG and the differential DF.

Figure 4:
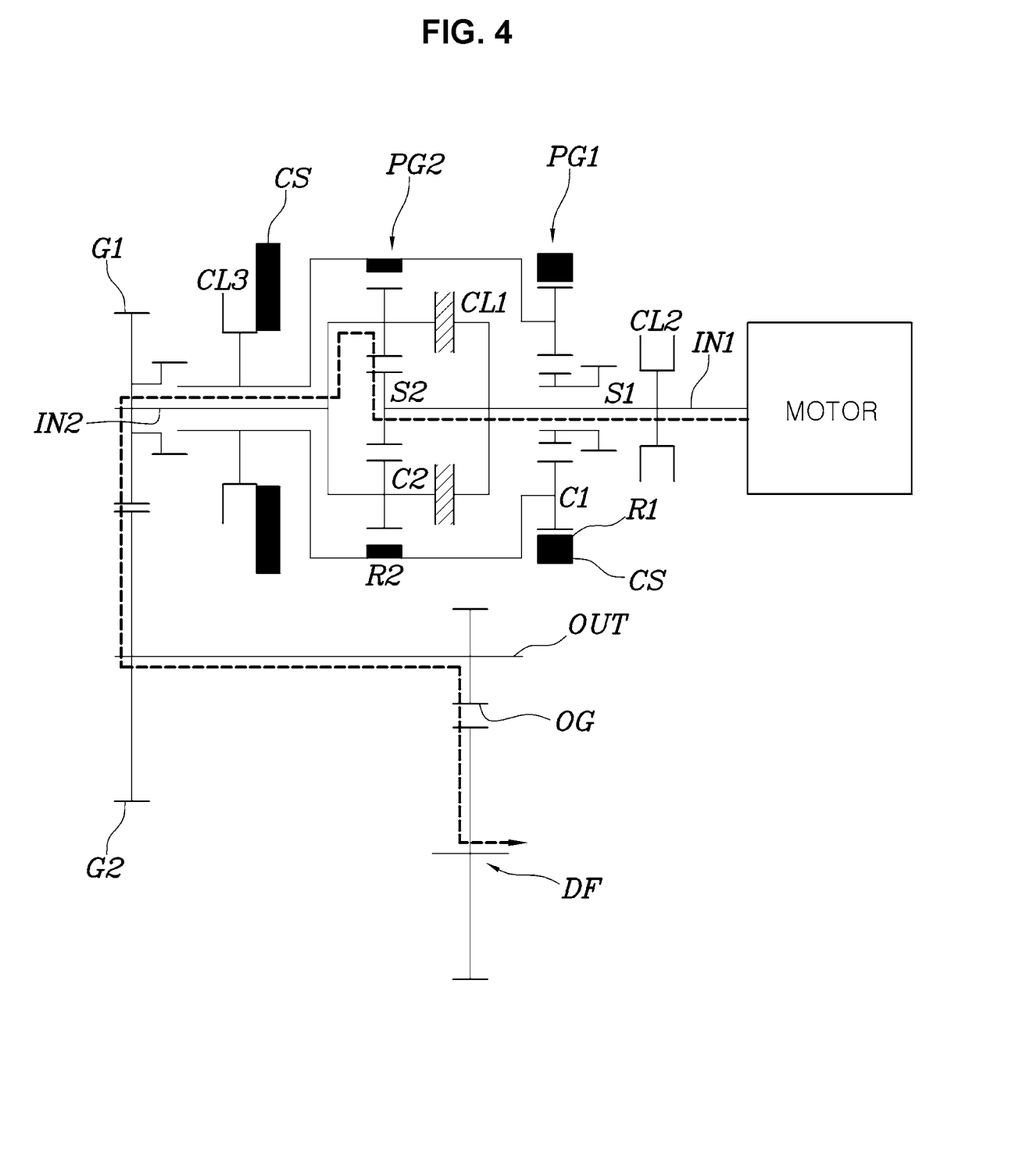

FIG. 4 shows the state in which friction is slightly generated on the first clutch CL1 to shift into a second gear during first-gear driving of FIG. 3. When friction is generated on the first clutch CL1, as described above, reacting force which is provided from the second ring gear R2 during the first-gear driving is offset, so that the third clutch CL3 is easily disengaged into the neutral state.

Figure 5:
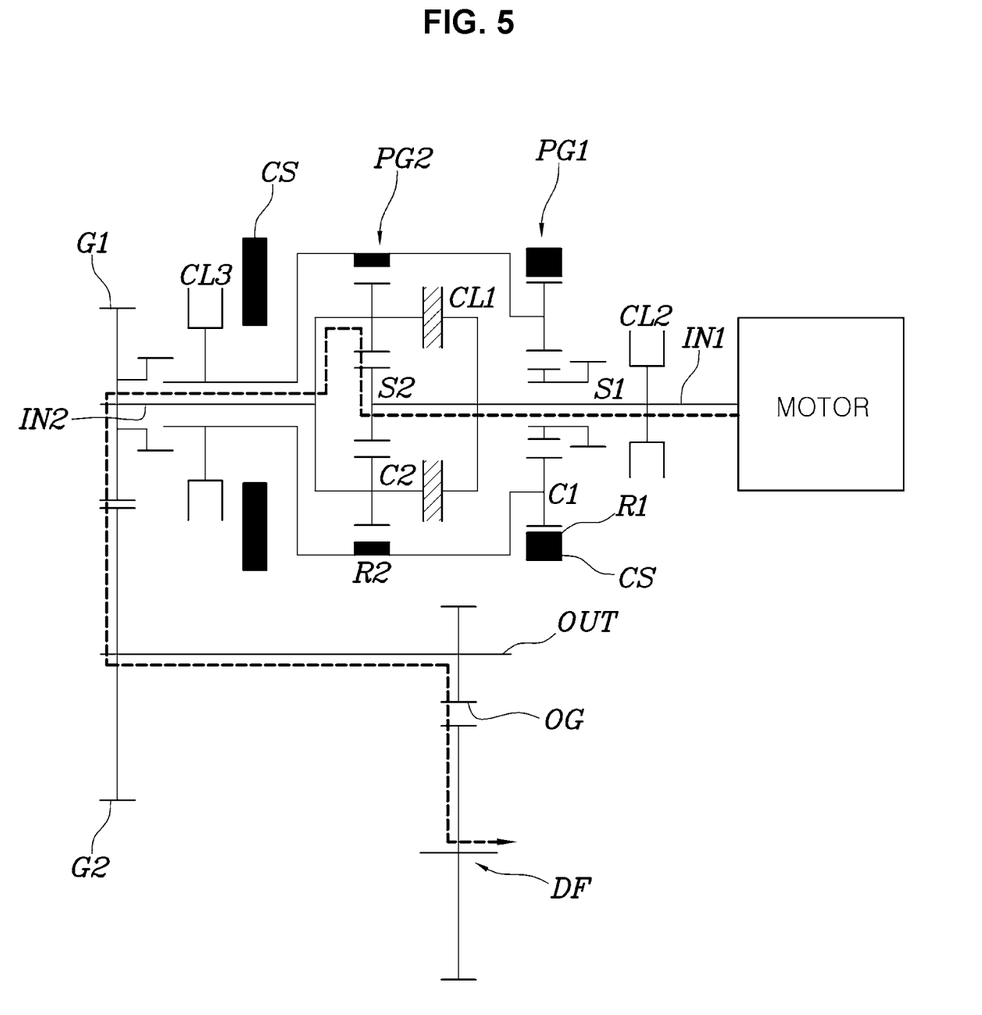

FIG. 5 shows the state in which when the third clutch CL3 is easily disengaged by performing slip control on the first clutch CL1, as in FIG. 4, power keeps being transmitted to the driving gear G1 with the third clutch CL3 disengaged and the first clutch CL1 keeps slipping.

Figure 6:
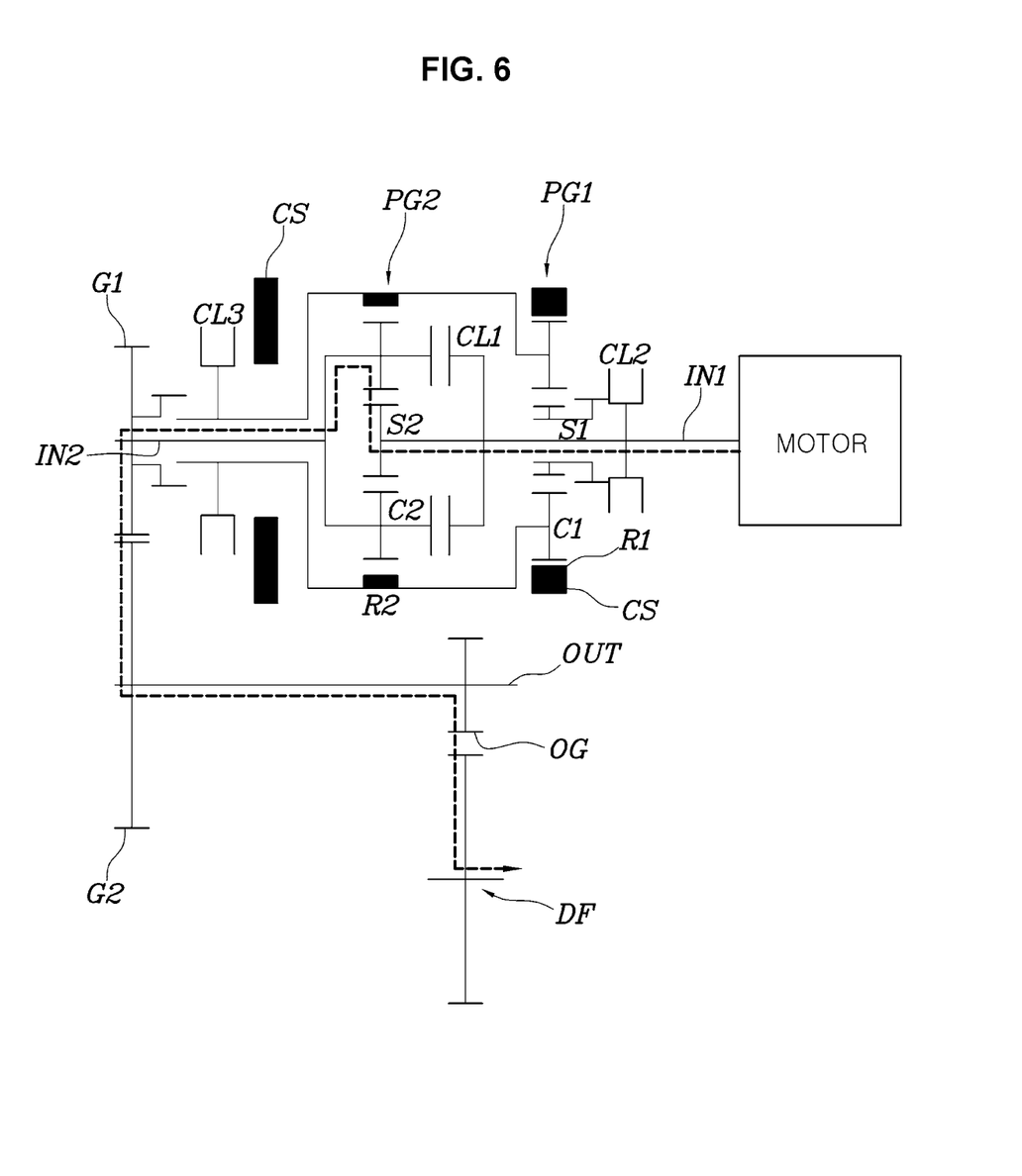

When the second clutch CL2 is engaged and the first clutch CL1 is disengaged by controlling the first clutch CL1 in the state shown in FIG. 5 such that the speed of the first sun gear S1 of the first planetary gear set PG1 becomes the same as the speed of the first input shaft IN1, the state shown in FIG. 6 is obtained.

In the state shown in FIG. 6, power is input through the second sun gear S2 and is then reduced and output to the second planet carrier C2 while the second ring gear R2 is reduced and rotated by the first planetary gear set PG1, so that the speed of the second planet carrier C2 becomes greater than the speed thereof in the first gear, shifting into the second gear.

Obviously, the power from the second planet carrier C2 is output to the differential DF through the driving gear G1, the driven gear G2, and the output shaft OUT.

Figure 7:
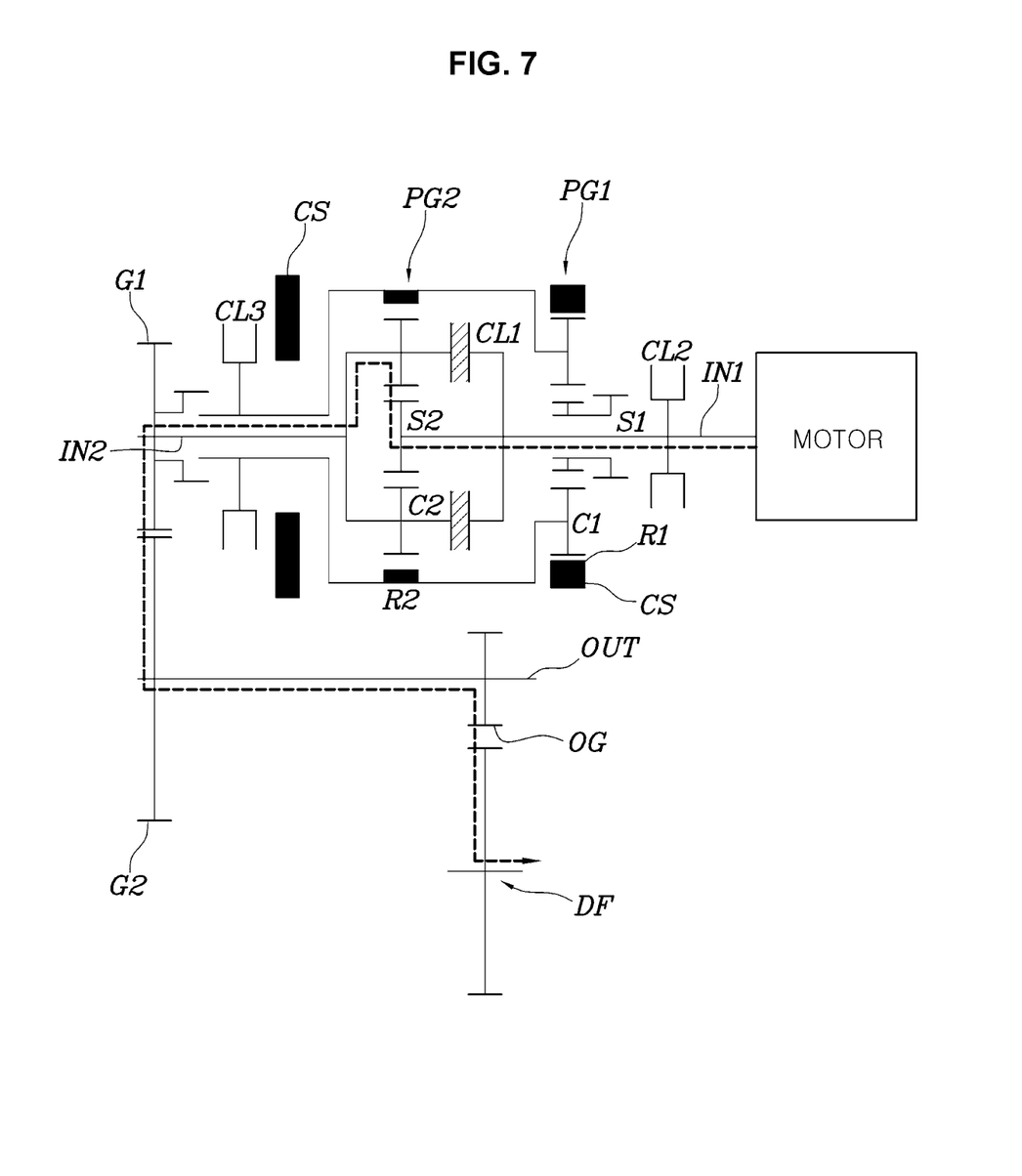
Figure 8:
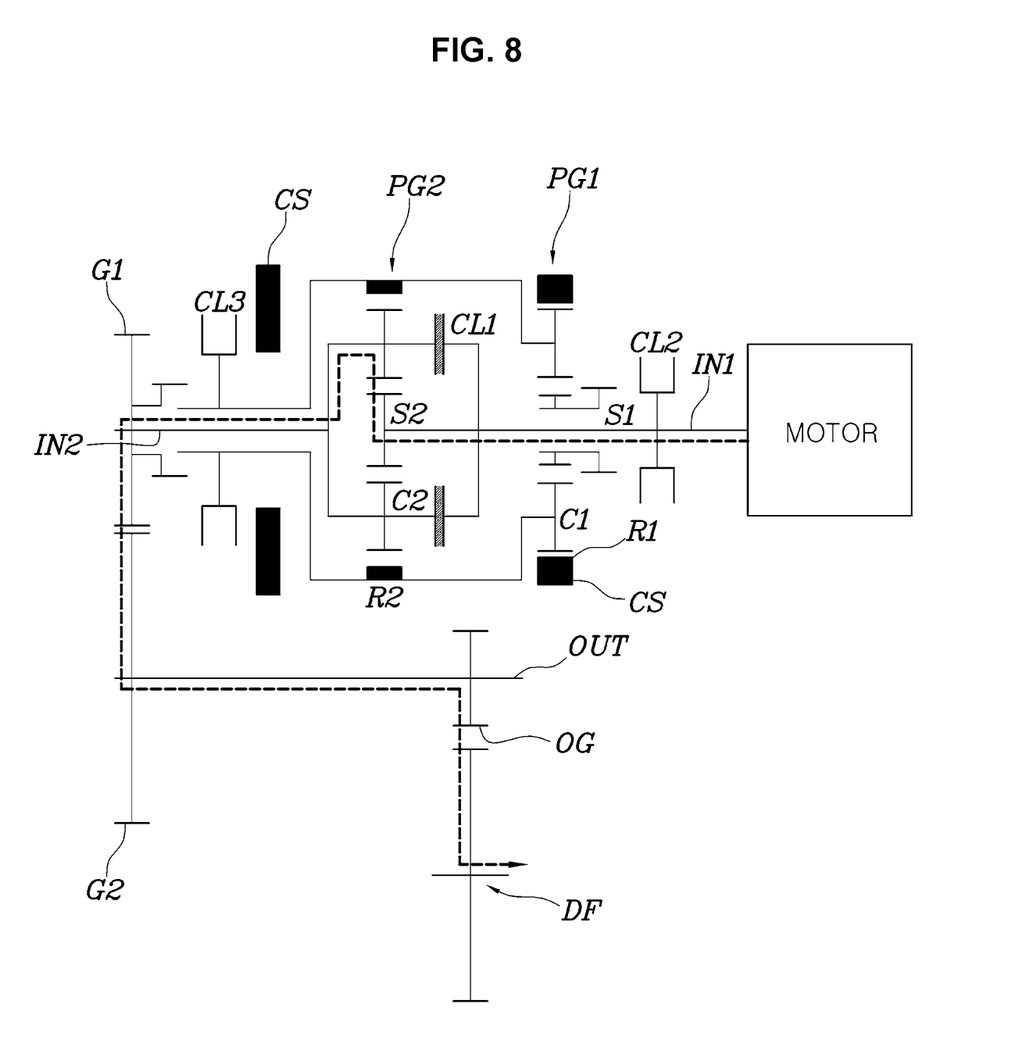

FIG. 7 shows the state in which the first clutch CL1 is slip-controlled and the second clutch CL2 is disengaged to shift into a third gear from the second gear shown in FIG. 6 and FIG. 8 shows the state in which shifting into the third gear is completed by completely engaging the first clutch CL1 with the second clutch CL2 disengaged. In the instant state, the power from the motor is intactly provide to the driving gear G1 without reducing and is then output to the output shaft OUT by substantially integrally rotating all the rotation elements of the second planetary gear set PG2.

Figure 9:
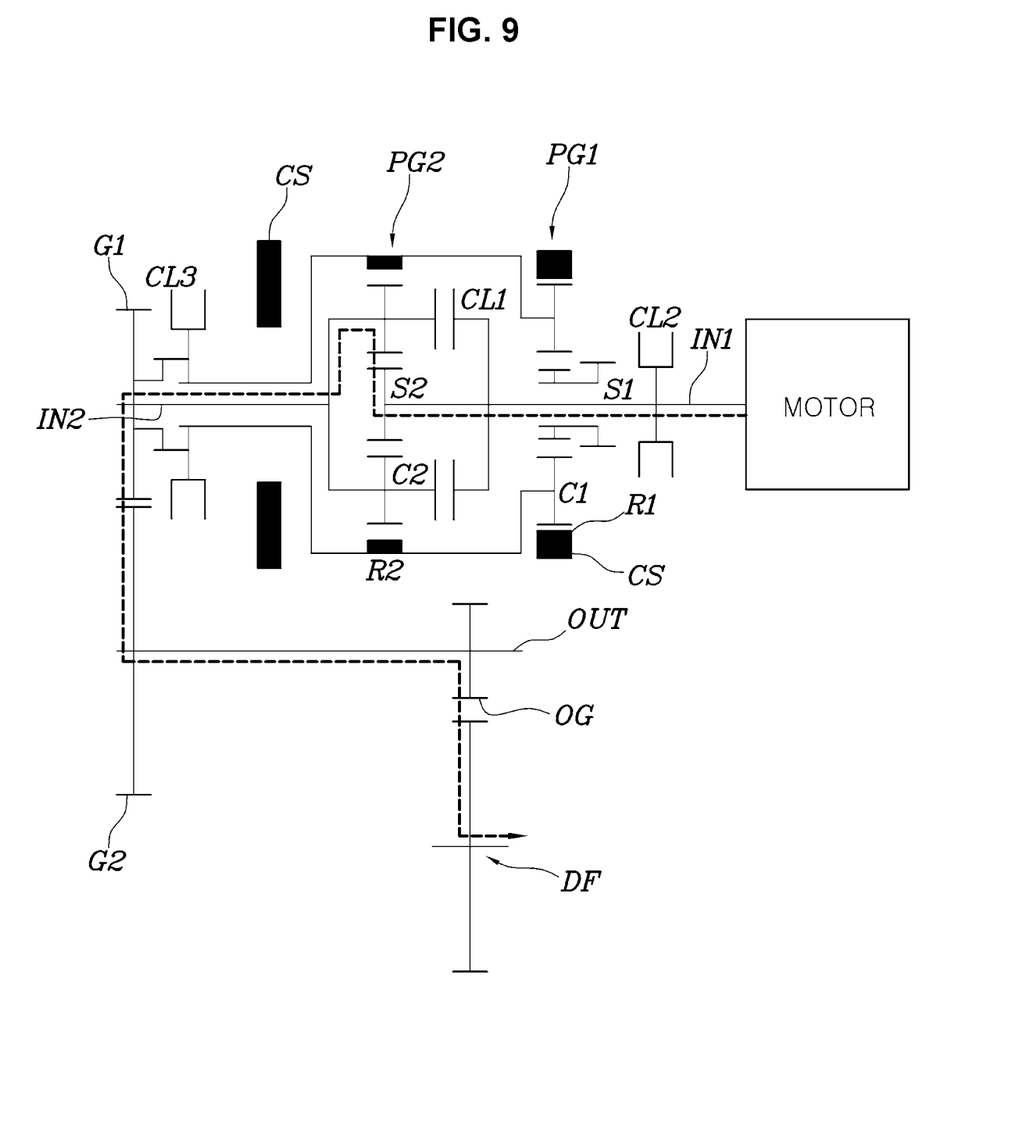

The third-gear state shown in FIG. 8 may be maintained only by consuming energy for keeping the first clutch CL1 engaged. Accordingly, as shown in FIG. 9, by connecting the second ring gear R2 to the driving gear G1 through the third clutch CL3, the second ring gear R2 and the second planet carrier C2 are substantially directly connected to each other, so all the rotation elements of the second planetary gear set PG2 can keep integrally rotating. Therefore, it is possible to stably maintain the third-gear stage without consuming energy for engaging the first clutch CL1.

Therefore, it is possible to increase the mileage of a vehicle and improve fuel efficiency by minimizing energy which is consumed while the vehicle is driven. Furthermore, it is possible to provide desired power to driving wheel even using a relatively small-capacity motor through multiple reduction of reduction by the first planetary gear set PG1 and the second planetary gear set PG2, reduction between the driving gear G1 and the driven gear G2, and reduction between the output gear OG and the differential DF. Accordingly, it is possible to decrease capacity of a motor and improve fuel efficiency of a vehicle accordingly.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings wherein the exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, the transmission comprising:
    a first input shaft fixedly connected to a motor,
    a second input shaft;
    a first planetary gear set including three rotation elements having:

a first rotation element rotatably mounted on the first input shaft and selectively connectable to the first input shaft;
a second rotation element; and
a third rotation element fixedly connected to a transmission housing,
a second planetary gear set including three rotation element having:
a first rotation element fixedly connected to the first input shaft;
a second rotation element; and
a third rotation element fixedly connected to the second rotation element of the first planetary gear set;
a first clutch mounted between the first input shaft and the second rotation element of the second planetary gear set and configured to selectively connect the first input shaft and the second rotation element of the second planetary gear set;
an output shaft;
a driving gear fixed to the second input shaft which is fixedly connected to the second rotation element of the second planetary gear set and rotating integrally with the second rotation element of the second planetary gear set;
a driven gear disposed on the output shaft and engaged with the driving gear,
a second clutch mounted on the first input shaft and selectively connecting the first rotation element of the first planetary gear set to the first input shaft; and
a third clutch mounted to selectively connect the third rotation element of the second planetary gear set with the driving gear.

2. The transmission of claim 1,
wherein the first planetary gear set is a simple single pinion planetary gear set, wherein the first rotation element of the first planetary gear set is a first sun gear, the second rotation element of the first planetary gear set is a first planet carrier, and the third rotation element of the first planetary gear set is a first ring gear, and
wherein the second planetary gear set is a simple single pinion planetary gear set, wherein the first rotation element of the second planetary gear set is a second sun gear, the second rotation element of the second planetary gear set is a second planet carrier, and the third rotation element of the second planetary gear set is a second ring gear.

3. The transmission of claim 2,
wherein the first clutch is a friction clutch that is configured to transmit power using friction, and
wherein the second clutch and the third clutch are engaging parts that are configured to transmit power by engaging with a gear.

4. A transmission for a vehicle, the transmission including
a first input shaft fixedly connected to a motor;
a second input shaft;
a first planetary gear set and a second planetary gear set disposed on the first input shaft, each including three rotation elements, in which one rotation element of the three rotation elements in the first planetary gear set and one rotation element of the three rotation elements in the second planetary gear set are continuously connected to each other;
a first clutch mounted to selectively connect remaining two rotation elements of the second planetary gear set;
a second clutch mounted to selectively connect one of remaining two rotation elements of the first planetary gear set and one of the remaining rotation elements of the second planetary gear set except for the continuously connected rotation elements;
a third clutch mounted to restrict a rotation of the continuously connected rotation elements of the first planetary gear set and the second planetary gear set; and
an output shaft engaged to the second planetary gear set and receiving torque from the second planetary gear set.

5. The transmission of claim 4,
wherein the first planetary gear set is a simple single pinion planetary gear set, in which the three rotation elements of the first planetary gear set are a first sun gear rotatably mounted on the first input shaft, a first planet carrier, and a first ring gear, respectively,
wherein the second planetary gear set is a simple single pinion planetary gear set, in which the three rotation elements of the second planetary gear set are a second sun gear, a second planet carrier, and a second ring gear fixed to the first planet carrier of the first planetary gear set, respectively,
wherein the continuously connected rotation elements are the first planet carrier and the second ring gear,
wherein the first ring gear is fixedly connected to a transmission housing, and
wherein the second sun gear is continuously connected to the first input shaft, and
wherein the second planet carrier is fixedly connected to the second input shaft.

6. The transmission of claim 5,
wherein the first clutch is mounted between the second sun gear and the second planet carrier of the second planetary gear set to selectively connect the second sun gear and the second planet carrier of the second planetary gear set, and
wherein the second clutch is mounted on the first input shaft and selectively connects the first sun gear of the first planetary gear set and the second sun gear of the second planetary gear set.

7. The transmission of claim 6, wherein the output shaft receives power through a driving gear fixedly connected to the second input shaft and the second planet carrier of the second planetary gear set and through a driven gear disposed on the output shaft, the driven gear engaged with the driving gear.

8. The transmission of claim 7, wherein the third clutch selectively connects the driving gear and the second ring gear of the second planetary gear set.

9. The transmission of claim 8, wherein the third clutch switches a state of disconnecting a rotation of the first planet carrier which is fixed to the second ring gear from the driving gear, and a state of connecting the first planet carrier and the second ring gear to the driving gear.

10. The transmission of claim 8, wherein the third clutch switches a state of restricting a rotation of the first planet carrier and the second ring gear from the driving gear, and a state of connecting the second ring gear to the second planet carrier and the driving gear.

* * * * *